Jan. 1, 1929.
W. H. HIMES
1,697,186
BALANCING MACHINE
Filed Oct. 2, 1922
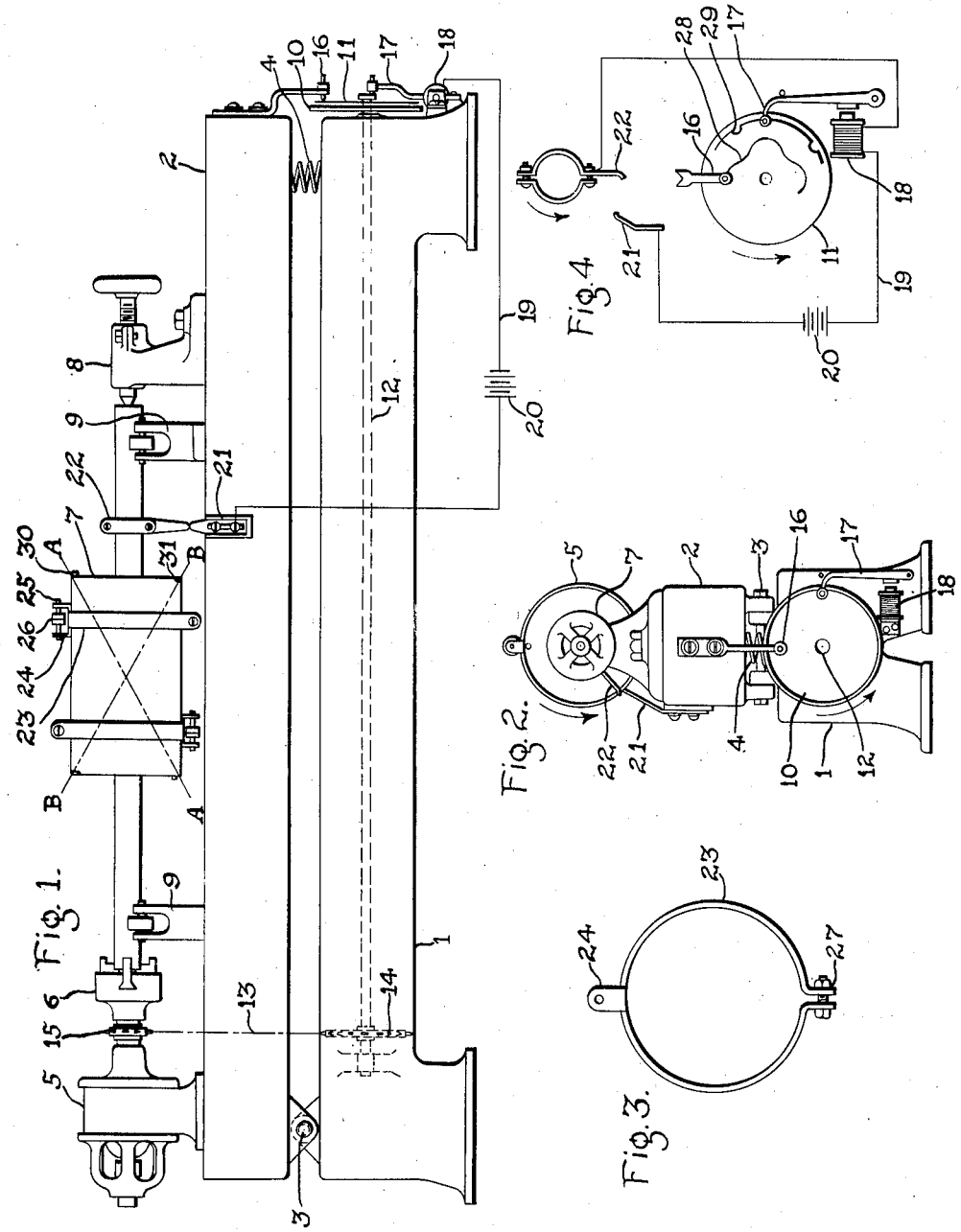
WITNESSES:
R. J. Butler.
W. B. Jaspert.
INVENTOR
Walter H. Himes.
BY
Wesley G. Carr
ATTORNEY Patented Jan. 1, 1929.

1,697,186

UNITED STATES PATENT OFFICE.

WALTER H. HIMES, OF PITTSBURGH, PENNSYLVANIA, ASSIGNOR TO WESTINGHOUSE ELECTRIC & MANUFACTURING COMPANY, A CORPORATION OF PENNSYLVANIA.

BALANCING MACHINE.

Application filed October 2, 1922. Serial No. 591,868.

My invention relates to balancing machines, more especially to a device for testing the dynamic balance of rotors to ascertain the necessary changes to be made to correct for improper distribution of the mass thereof.

Among the objects of this invention is to provide a simple method and apparatus which shall be efficient in determining the value and location of the correction necessary to dynamically balance rotors and other rotating machine elements.

It is well known that rotors may be in static balance about their respective axes of rotation, yet dynamically unbalanced, resulting in chatter and vibration and hence deterioration of the wearing parts.

My present invention is directed to a method and apparatus for determining the value and location of such inequalities in rotatable machine elements in which I utilize an indicating device which will illustrate graphically the condition of balance.

In the accompanying drawing constituting a part hereof, in which like reference characters designate like parts, Figure 1 is a side elevational view of the machine for testing the dynamic unbalance of rotors and the like made in accordance with this invention.

Fig. 2 is an end elevational view thereof.

Fig. 3 is an elevational view of a balance-adjusting device constituting a part of the apparatus shown in Fig. 1, and, Fig. 4 is a diagrammatic view of the indicating device employed in connection with the testing mechanism.

In the Figure 1, the numeral 1 designates a base support having a movable carriage 2 flexibly secured, at one end thereof, by a pivotal hinge connection 3 and having a helical spring coil 4 interposed therebetween at the end opposite the hinge 3.

The movable carriage 2 is provided with a driving mechanism, such as a motor 5, which is mounted at one end thereof and which is provided with a chucking device 6 that is adapted to receive a rotor 7, or other rotatable machine element to be tested which is secured, at the free end, by a movable tail stock 8. The rotor is further supported by a plurality of roller supports 9.

A disc 10, which is adapted to receive a chart 11, is rotatably mounted on a shaft 12 in the base support 1 and is connected to the driving mechanism 5 by a sprocket chain 13 and sprocket wheels 14 and 15 or other suitable gearing. The tooth ratio of the sprocket wheels 14 and 15 may be such as to attain any unitary speed relation between the shaft 12 and the rotor 7, but my preferred ratio will be such as to provide one rotation of the shaft 12 to four rotations of the rotor, for the purpose hereinafter set forth.

A recording needle 16 is secured to the movable carriage 2 in co-operative engagement with the chart 11, and a similar recording needle 17 is mounted in co-operative alinement with a solenoid 18 to the base support 1. The indicator needle 17 is actuated by solenoid 18 which is connected, by a circuit 19 containing a suitable source of electrical energy, such as a battery 20, to a stationary contact member 21 mounted on the carriage 2 which is adapted to engage a movable contact member 22 adjustably secured on the rotor shaft.

A plurality of balance-adjusting devices comprising a banding rim 23 provided with a forked bracket 24 having a movable pin 25 secured therein which is adapted to receive a plurality of washers 26 are secured to the body of the rotor 7 by clamp bolts 27.

The operation of my device is, briefly, as follows: A rotor 7 to be tested, having been put in static balance, is rotatably mounted on the movable carriage 2 and the balance-adjusting bands 23 are secured thereon. The bands 23 are designed to be in perfect balance when the washers 26 are omitted, and the contact member 22 is secured to the rotor shaft in alinement with the stationary contact 21 in any suitable position. The device is set in motion by energizing the motor 5 which actuates the rotor to the speed desired.

Any improper balance of the rotor mass will, because of the movement of the mass having an arm equal to the distance from the hinge support 3, result in vertical movement or vibration of the carriage 2 which is registered by the recording needle 16 on the chart 11 in the form of a sinuous curve 28. Since the number of rotations of the indicating chart is one-fourth of the speed of the rotor, there will be four peaks and troughs in the curve, the amplitude of which indicates the amount of unbalance of the rotor.

The adjustable contact 22 engaging the stationary contact 21, every revolution energizes the solenoid 18 which effects a movement of the recording needle 17 which registers on the chart in the form of a notch 29, there being as many notches as there are peaks on the curve. The phase relation of the notches and peaks will be the same. The location of unbalance will be indicated by the relative position of the notch to its respective peak.

The skilled operator will make allowance for balance in accordance with the amplitude of the peaks and make a corresponding adjustment on the members 23, by adding a plurality of weights or washers 26, and shifting the position of the weights to the location of unbalance, relative to the notches 29. It is necessary to make equal adjustments on the rotor diagonally opposite one another, as indicated by the diagonals A—A and B—B, to bring it in proper balance, and the operation is then repeated until a substantially true circle is registered by the indicating needle 16. Permanent adjustments of the weights are made on the rotor body by inserting screw plugs 30 or forming lead deposits 31 of suitable weight on the end of the rotor, as shown. The weight of the corrected mass is inversely proportional to the radius of location from the horizontal axis of the rotor.

It will be readily understood, from the above description of my invention, that a balance-correcting device formed in accordance therewith provides a simple and efficient means for testing and correcting an improper balance of rotating masses, and that such a device further gives a graphic presentation of the condition of balance which expedites the making of true and accurate adjustments.

Although I have described a specific embodiment of my invention, it will be obvious to those skilled in the art that various modifications may be made in the details of construction. For instance, the general design of base plate, carriage and rotor supports may be altered to suit the particular need to which it is to be applied and the indicating or recording mechanism may be altered in any manner to automatically obtain a graphic record of the condition of balance. These and other changes may be made in details of construction without departing from the principles herein set forth.

I claim as my invention:

1. In an apparatus for testing rotors, a base, an oscillatable bed mounted thereon, means for journalling a rotor for rotation on said bed, and indicating means for determining the relative location of the dynamic unbalance of said rotor, said indicating means being associated with said base and bed, and actuated by the rotation of the rotor.

2. In an apparatus for testing rotors, a base, an oscillatable bed mounted thereon, means for journalling a rotor for rotation on said bed, and indicating means for determining the relative amount and location of the dynamic unbalance of said rotor, said indicating means comprising a marker associated with said bed and a chart mounted on said base and means for moving the chart in accordance with the rotation of the rotor.

3. In an apparatus for testing rotors, a base, an oscillatable bed mounted thereon, means for journalling a rotor for rotation on said bed, automatic indicating means for determining the relative amount and location of the dynamic unbalance of said rotor and means for moving one element of the indicator in accordance with the rotation of the rotor.

4. In an apparatus for testing rotors, a base, an oscillatable bed mounted thereon, means for journalling a rotor for rotation on said bed, means for graphically indicating the relative amount and location of the dynamic unbalance of said rotor and means for moving one element of the indicator in accordance with the rotation of the rotor.

5. In an apparatus for testing rotors, a base, an oscillatable bed mounted thereon, means for journalling a rotor for rotation on said bed, automatic means for graphically indicating the relative amount and location of the dynamic unbalance of said rotor and means for moving one element of the indicator in accordance with the rotation of the rotor.

6. In an apparatus for testing rotors, a base, a vibratable carriage movably secured at one end, resilient means interposed between said base and carriage, a plurality of supports movably mounted on said carriage which are adapted to rotatably support a rotor and indicating means for determining the relative amount of dynamic unbalance of said rotor, one element of said indicating means being actuated in accordance with the rotation of the rotor.

7. In an apparatus for testing rotors, a base, a vibratable carriage movably secured at one end, resilient means interposed between said base and carriage, a plurality of supports movably mounted on said carriage which are adapted to rotatably support a rotor and indicating means operatively connected to said rotor for determining the relative lcation of dynamic unbalance thereof.

8. In an apparatus for testing rotors, a base, a vibratable carriage movably secured at one end, resilient means interposed between said base and carriage, a plurality of supports movably mounted on said carriage which are adapted to rotatably support a rotor and indicating means operatively connected to said rotor for determining the relative amount of dynamic unbalance thereof.

9. In an apparatus for testing rotors, a base, a vibratable carriage movably secured at one end, resilient means interposed between said base and carriage, a plurality of supports movably mounted on said carriage which are adapted to rotatably support a rotor and means for determining the relative amount of dynamic unbalance of said rotor, said indicating means comprising a recording device adapted to register the vertical vibratory movement of said carriage.

10. In an apparatus for testing rotors, a base, a vibratable carriage movably secured at one end, resilient means interposed between said base and carriage, a plurality of supports movably mounted on said carriage which are adapted to rotatably support a rotor and means for determining the relative amount of dynamic unbalance of said rotor, said indicating means comprising a recording device having driving means geared to the rotor and adapted to register the vertical vibratory movement of said carriage.

11. In an apparatus for testing rotors, a base, a vibratable carriage movably secured at one end, resilient means interposed between said base and carriage, a plurality of supports movably mounted on said carriage which are adapted to rotatably support a rotor and means for determining the relative amount of dynamic unbalance of said rotor, said indicating means comprising a shaft, a disc rotatably mounted thereon, said shaft being geared to said rotor and said disc being adapted to receive a chart and a recording needle mounted on said carriage in co-operative engagement with said chart.

12. In an apparatus for testing rotors, a base, a vibratable carriage movably secured at one end, resilient means interposed between said base and carriage, a plurality of supports movably mounted on said carriage which are adapted to rotatably support a rotor, means for determining the relative amount and location of dynamic unbalance thereof, a movable contact mounted on said rotor, a chart rotatably mounted on said base having a recording needle secured to said carriage and a solenoid-actuated recording needle connected to a stationary contact secured to said carriage in co-operative alinement with said movable contact, both of said recording needles being in co-operative engagement with said chart.

13. The combination with a dynamic-balance-testing device, of means for indicating the relative amount of dynamic unbalance of the device being tested, and means for indicating the relative location of said unbalance, said first-named means comprising a recording disc, means for rotating the same, and a recording indicator in contact with the face of said disc adapted to move radially thereon relative to the vertical movement of the said device, and said last-named means comprising a magnetically actuated recording indicator in contact with the face of said disc adapted to locate a point on said device in synchronous relation to the rotatory and vertical vibratory movements thereof.

14. In a machine for testing rotors, in combination, means for rotatably supporting the rotor to be tested, said supporting means being disposed to permit oscillatory movement of the rotor in response to dynamic unbalance and an indicating device comprising one element disposed to be actuated in accordance with the rotation of the rotor and a second element disposed to be actuated in accordance with the oscillatory movement of the rotor.

15. In a device for testing the dynamic unbalance of objects, the combination with means for rotating an object to be balanced, of means operating in synchronism with the rotation of said object for indicating the amplitude of the radial movements of said object and means for relating the radial movements of the object angularly to said object.

In testimony whereof, I have hereunto subscribed my name this 27th day of September, 1922.

WALTER H. HIMES.